March 2, 1943. C. D. PETERSON ET AL 2,312,975
SELECTING AND SHIFTING MECHANISM FOR CHANGE SPEED GEARINGS
Filed April 11, 1940 3 Sheets-Sheet 2

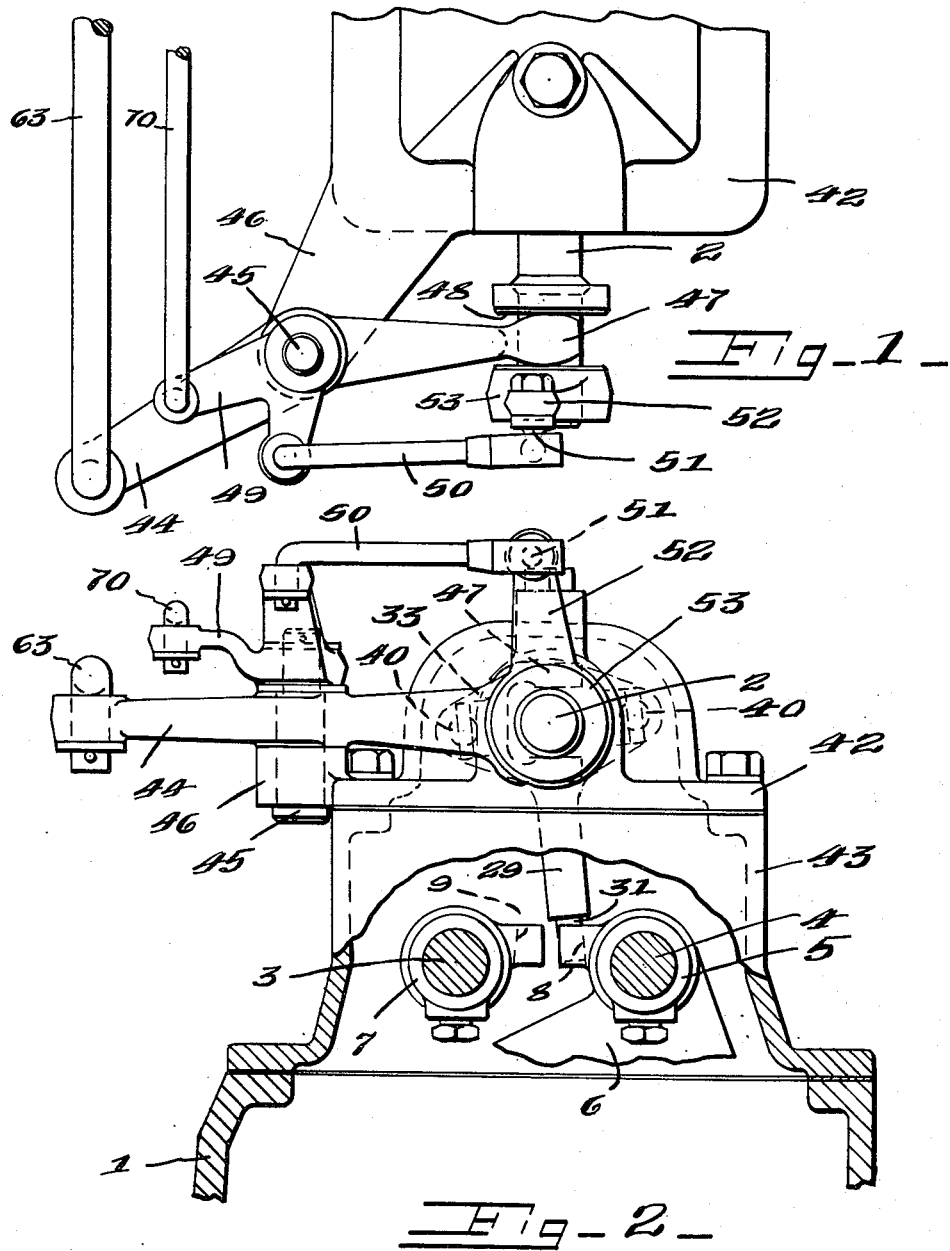

INVENTORS
Carl D. Peterson Albert H. Weime
BY Bodell & Thompson
ATTORNEYS.

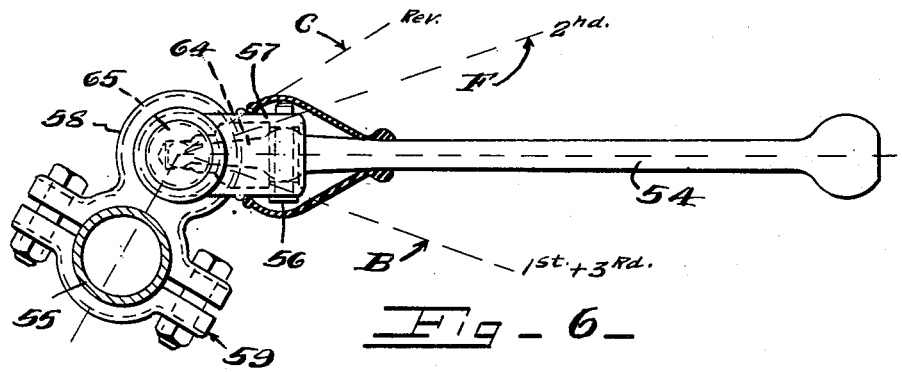
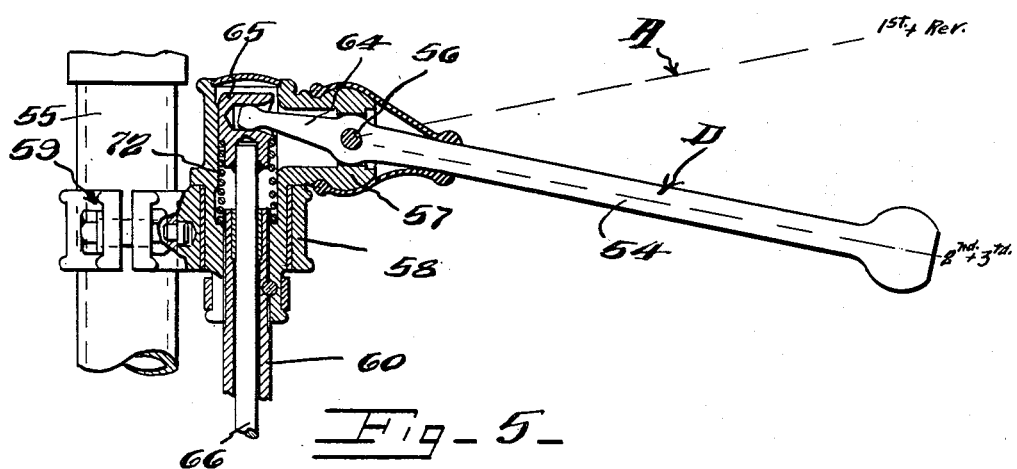
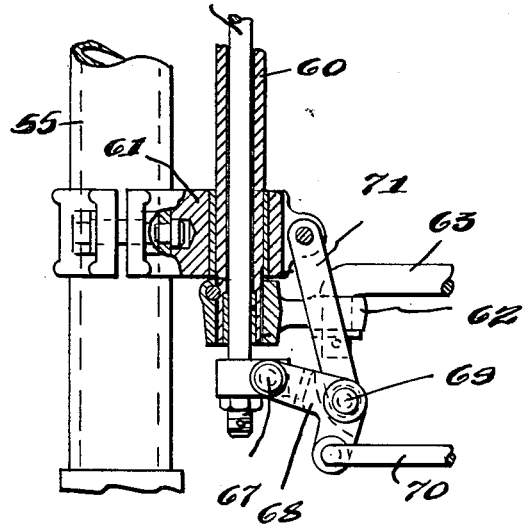

Patented Mar. 2, 1943

2,312,975

UNITED STATES PATENT OFFICE 2,312,975

SELECTING AND SHIFTING MECHANISM FOR CHANGE SPEED GEARINGS

Carl D. Peterson and Albert H. Deimel, Toledo, Ohio

Application April 11, 1940, Serial No. 329,162

4 Claims. (Cl. 74—473)

This invention relates to shifting mechanism for change speed transmission gearings, and has for its object a particularly simple, economical and compact motion transmitting mechanism for transferring the selecting and shifting movements of a manual lever remote from the gear box to a selecting and shifting member or shaft associated with the gear box or mounted in the cover thereof.

It further has for its object a particularly simple and compact motion transmitting mechanism between a manual selecting and shifting lever mounted on the steering column of the vehicle and the shiftable selecting and shifting member or shaft associated with or mounted in the cover of the gear box.

The invention consists in the novel features and in the combinations and constructions hereinafter set forth and claimed.

In describing this invention, reference is had to the accompanying drawings in which like characters designate corresponding parts in all the views.

Figure 1 is a fragmentary plan view of a gear box showing the motion transmitting means for effecting the selecting and shifting movements of the selecting and shifting member or shaft in the cover of the gear box.

Figure 2 is a view partly in section looking upwardly in Figure 1.

Figure 5 is a longitudinal sectional view through the portion of the selecting and shifting member, which is mounted on the steering column, and the motion transmitting connections operated thereby.

Figure 6 is a plan view, partly in section, of parts seen in Figure 5.

Figure 3:
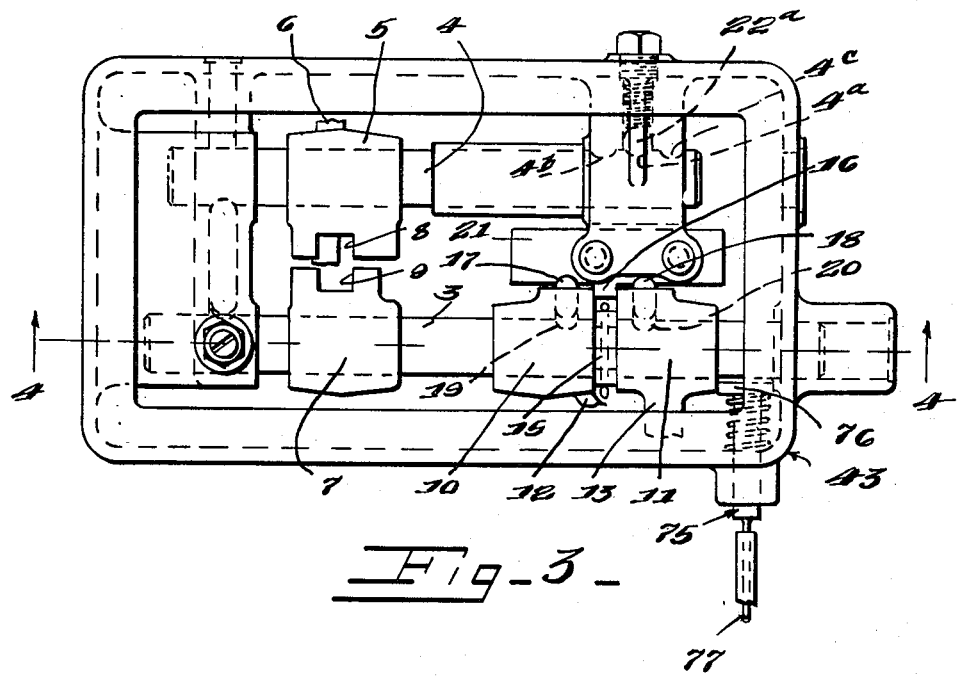
Figure 3 is a plan view of the gear box, the cover being removed.

1 designates the gear box in which the change speed transmission gearing including shiftable elements, is mounted. The gearing may be of any well-known construction and certain features of the shifting mechanism are particularly designed for transmission mechanisms embodying balking ring clutches. The features of the shifting mechanism particularly designed for use with balking ring clutches form the subject matter of our pending application, Serial Number 329,161, filed April 11, 1940.

2 designates a selecting and shifting member associated with the gear box, it being here shown as a shaft axially shiftable from neutral position, and also having a rocking selecting movement. 3 and 4 are axially movable shift rods shiftable in opposite directions from neutral. The rod 4 has a hub or block 5 thereon, which has a fork 6 coacting with one of the shiftable elements, as a clutch of a gearing, and is shiftable in opposite directions from neutral. The shiftable rod 3 has a hub or block 7 thereon. The two blocks 5 and 7 are provided with notches 8 and 9 arranged in alinement when both shift rods are in neutral. The rod 3 also has hubs or blocks 10 and 11 thereon provided with forks 12 and 13 for coacting with other shiftable elements, as gears or clutches in the gear box. The hubs or blocks 10 and 11 are separated from each other by a collar 15 on the rod 3 and are also slidably mounted on the rod 3, and means is provided whereby when the rod is shifted in one direction, as to the left, from neutral, the block 10 is locked to the rod 3, while the rod 3 is free to slide through the block 11, and when the rod 3 is shifted in the opposite direction, or to the right, from neutral, the block 10 is unlocked from the rod 3 and the block 11 locked thereto. When the rod 3 is being shifted to the left, the block 11 is prevented from sliding therewith by a stop shoulder 16, and when the rod 3 is shifted to the right from neutral, the block 10 is held from shifting therewith by the shoulder 16. The means for keying these blocks to the shaft is here shown as sliding poppets or bolts 17, 18 carried in radial bores in the blocks 10 and 11 and having cam-shaped ends coacting with complemental notches 19, 20 in the rod 3, and also in notches in a plate 21 on which the shoulder 16 is provided. The length of these bolts is such that when one end is in one of the notches 17, 18, the other end is out of the notch 19 or 20, and vice-versa. The shaft 2 is impositively held or located in neutral position by holding means, as a spring-pressed poppet 22. Likewise, the blocks 10 and 11, and hence the rod 3, is held in neutral and shifted position by spring-pressed poppets 23 and 24 respectively, coacting respectively with notches 25 and 26 in the block 10, and notches 27 and 28 in the block 11. The notches are located to coact with the poppets 23 and 24, when the rod is in neutral and in shifted positions. The rod 4 is likewise located in neutral and shifted positions by a similar spring-pressed poppet 22ª coacting with notches 4ª, 4ᵇ, 4ᶜ in the rod.

The shaft 2 is provided with a member, as the lever 29, mounted to rock about the axis of the shaft and also to shift lengthwise of the axis of the shaft, when the shaft is shifted axially, and preferably the lever 29 rocks as a unit with the shaft, so that rocking of the shaft also rocks the lever. Also, as here shown, the axial movement of the shaft 2 is transferred through yielding means or springs to the lever 29. This lever 29 is a selecting and shifting lever, and has an arm provided with a finger 31 extending into the notches 8, 9 of the blocks 5 and 7 and shiftable laterally from central position into selective engagement with either one of the blocks. The lever 29 has a hub or sleeve 32 on the shaft 2 and an annular collar or abutment 33 intermediate the ends of the sleeve. 34 and 35 are collars or abutments fixed to the shaft at spaced apart points, as by screws 36 and 37, and the sleeve 32 is located between the abutments and is capable of movement in opposite directions from neutral or central position toward the abutments.

38 and 39 are compression springs interposed between the abutments 34 and 35 respectively and the annular collar 33. The abutments are connected together by tie or guide rods 40 on diametrically opposite sides of the shaft, and the lever 29 is formed with eyes 41 slidable along the rods. These springs are one of the features used in connection with a transmission gearing embodying synchronizing or balking ring clutches and are for the purpose of permitting axial shifting of the rod 2, so as to compress one or the other of the springs 38, 39, which completes the shifting when the speeds of two clutch parts to be clutched together synchronize. This feature forms the subject matter of our pending application, Serial Number 329,161 filed April 11, 1940.

Figure 4:
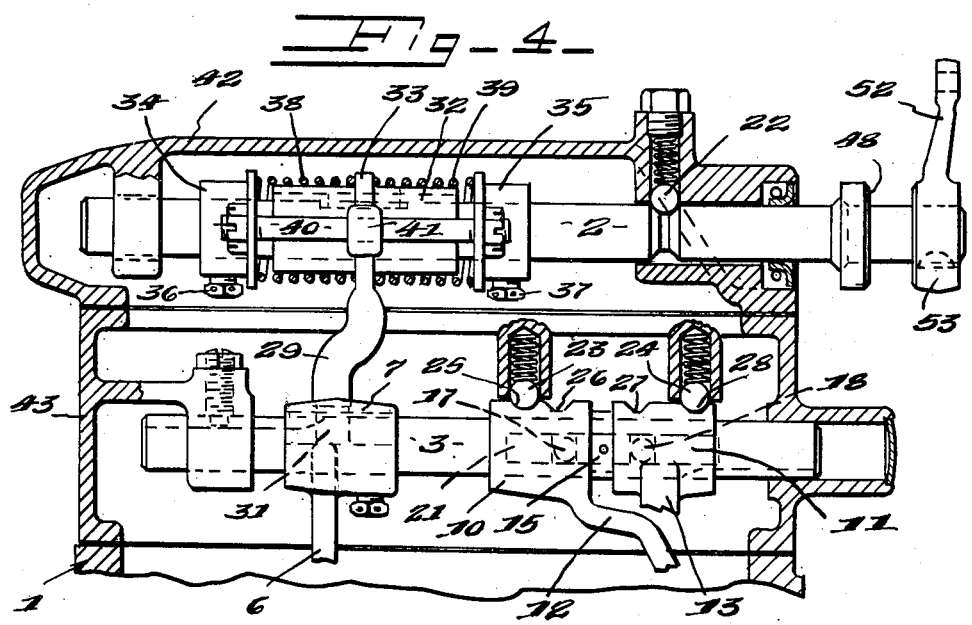
Figure 4 is a longitudinal fragmentary sectional view taken through the cover of the gear box or on the plane of line 4—4, Figure 3, the contiguous portion of the gear box being also shown.

Obviously, shifting of the shaft 2 to the left (Figure 4) will cause the spring 39 to compress, and if the operator retains his hold on the manual lever, to be described, completes the shifting when the speeds synchronize across. A similar operation takes place when the shaft 2 is shifted to the right from neutral compressing the spring 38, and this shaft 2 is common to both shift rods 3, 4.

The means for shifting the shaft 2 and for rocking it includes a manually operated selecting and shifting lever located remote from the gear box, and motion transmitting means between said lever and the shaft 2. The shaft 2 is mounted in the cover 42 of the gear box and the rods 3, 4 are mounted in a spacer section 43 interposed between the cover 42 and the gear box, the section 43 being interchangeable with the cover of a conventional gear box.

This motion transmitting means includes a lever 44 pivoted at 45 between its ends to the cover 42 or to a bracket 46 thereon and having a yoke 47 working in a circumferential groove 48 on the portion of the shaft 2 extending outside of the gear box or between collars thereon. The motion transmitting means further includes a lever 49, which is an angle lever, pivoted at its angle, preferably at 45, and having one arm thereof connected at one end by a link 50 to a crank 51 on a rock arm 52, the hub 53 of which forms one of the collars on the shaft 2 providing the groove 48 for the yoke 47.

54 designates a manual selecting and shifting lever having a lateral selecting movement and a fore-and-aft shifting movement, this being located on the steering column 55 of the vehicle, it being here shown as pivoted at 56 on a horizontally extending axis to a hollow bracket 57 mounted in a bearing 58 to have a fore-and-aft rocking movement in a horizontal direction or about an inclined axis parallel to the steering column, the bearing being secured to the steering column in any suitable manner, as by clamping means 59. The bracket 57 is coupled on a hollow rock shaft or tube 60 rotatably mounted in a bracket 61 on the steering column and carrying a rock arm 62 in its lower end which is connected by a link 63 to the lever 44.

The manual lever 54 is provided with a short arm 64 extending beyond its pivot 56 and coacting with a head 65 at the upper end of an endwisely movable rod 66 extending axially through the hollow rock shaft or tube 60 and beyond the lower end of the same, where it is pivoted at 67 to one arm of an angle or bell crank lever 68 pivoted at its angle at 69. The other arm of the lever is connected by a link 70 to the lever 49. The pivot 69 is supported from the steering column or the bracket 61 thereon by a link 71. A return spring 72 is interposed between the head 65 and the bracket 57. A driver operated lock 75 is provided, which must be operated prior to shifting into reverse. This is shown as a spring-pressed plunger guided in a passage in the side wall of the spacer section 43 of the cover, and extending to the outside thereof, the bolt having a head 76 normally located between the shifter block 11 and a wall of the section 43 to prevent shifting of the block 11 into reverse. The plunger 75 is operated from a point near the driver by any suitable means, here shown as a Bowden wire 77.

In operation, upward movement of the manual lever 54 about its pivot 56 into position A (Figure 5) moves the rod 66 downward, this being the selecting movement, and the rod 66, through the bell crank 68, link 70, lever 49 and link 50, rocks the shaft 2 to select the first or reverse gear shift, that is, to cause the finger 31 and the lever 29 to select the rod 3, and movement of the lever 29 rearward or downward into position B (Figure 6), effects the shifting of the rod 3 to the left (Figures 3, 4), causing the shoulder or collar 15 to move the block 10 therewith and shift the gearing into first speed forward. Movement in the opposite direction from neutral of the manual lever 54 into position C (Figure 6), causes the rod 3 to be shifted by the lever 44 to the right, causing the shoulder 15 to shift the block 11, producing reverse.

Movement of the manual lever 54 downwardly from horizontal position into position D, pulls the rod 66 upwardly, and the motion thereof is transferred to the bell crank 68, link 70 to the lever 49, which through the link 50 rocks the shaft 2 to cause the finger 31 to engage exclusively with the block 5. Then shifting of the manual lever 54 forwardly into position F (Figure 6) rocks the hollow rock shaft or tube 60 to cause the rock arm 62 thereof to actuate the lever 44 through the link 63 and shift the shaft 2 to the left (Figure 3) from neutral and engage the second speed forward clutch or shiftable element of the transmission gearing. Movement in the opposite direction from neutral causes the shaft 2 to move to the left from neutral position into position B (Figure 6) to engage third speed forward or direct drive clutch.

When synchronizing, and more especially when balking ring clutches are used, the spring 38 or 39, as the case may be, will be compressed, until the speeds of the clutch members to be engaged synchronize or cross and unlock the balking ring of the selected clutch, when the spring 38 or 39 will complete the engagement of the toothed members of the clutches, providing the operator holds the manual lever 54 from being returned to central position under the re-action of the spring 38 or 39, while the speeds are synchronizing.

What we claim is:

1. In a selecting and shifting mechanism for change speed gearings including a gear box and shiftable elements therein, a shaft having a rocking selecting movement and an axial shifting movement, a manual selecting and shifting lever remote from the gear box and having a lateral selecting and a fore-and-aft shifting movement, a pair of levers mounted on the gear box and operatively connected to said shaft to rock and shift the same axially respectively, and motion transmitting means operated by the manual lever to transfer the selecting movement of the manual lever to one of the pair of levers and the fore-and-aft movement of the manual lever to the other of said pair of levers.

2. In a selecting and shifting mechanism for change speed gearings including a gear box and shiftable elements therein, a shaft having a rocking selecting movement and an axial shifting movement, a manual selecting and shifting lever remote from the gear box and having a lateral selecting and a fore-and-aft shifting movement, a pair of levers mounted on the gear box and operatively connected to said shaft to rock and shift the same axially respectively, and motion transmitting means operated by the manual lever to transfer the selecting movement of the manual lever to one of the pair of levers and the fore-and-aft movement of the manual lever to the other of said pair of levers, the pair of levers being mounted upon a common pivot on the gear box.

3. In a selecting and shifting mechanism for change speed gearings including a gear box, gearing therein including shiftable elements and a cover for the gear box, the combination of a shaft having axial shifting and rocking selecting movements, a lever mounted on the cover and coacting with the shaft to shift it axially, a second lever mounted on the cover, means for transferring the movement of the second lever to the shaft to rock the same, a manual shifting lever remote from the gear box and having lateral selecting and fore-and-aft shifting movements, and connections between the manual lever and the levers mounted on the cover of the gear box for transferring the selecting movement to the second lever and the shifting movement to the first lever.

4. In a selecting and shifting mechanism for change speed gearings including a gear box, gearing therein including shiftable elements and a cover for the gear box, the combination of a shaft having axial shifting and rocking selecting movements, a motion transmitting lever mounted on the cover and means operable thereby to transfer the movement thereof to the shaft to shift it axially, a second motion transmitting lever mounted on the cover, means operated thereby for transferring the movement of the second lever to the shaft to rock the same, a manual selecting and shifting lever, remote from the gear box, and having lateral selecting and fore-and-aft shifting movements, an axially movable rod operable by the selecting movement and a rock shaft operable by the fore-and-aft movement, a third motion transmitting lever operated by the axial movement of said rod, and connections between it and the second motion transmitting lever, a rock arm mounted on said rock shaft, and means connecting it and the first motion transmitting lever.

CARL D. PETERSON.
ALBERT H. DEIMEL.